Dec. 13, 1949      B. M. YANKOVITCH      2,491,144
PRESSURE COOKER COVER CONSTRUCTION
Filed Oct. 12, 1946      2 Sheets—Sheet 1
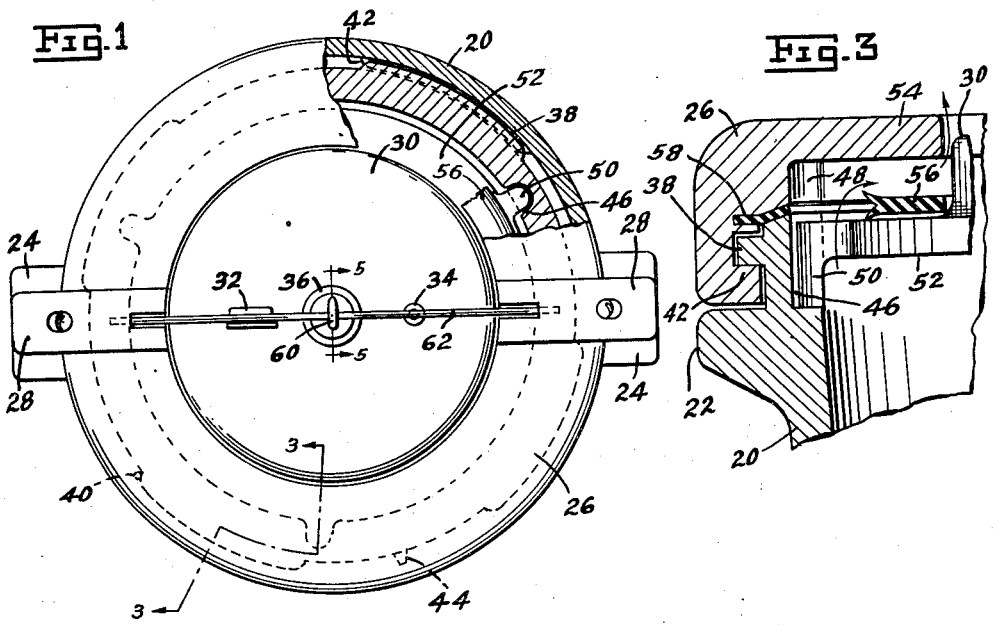
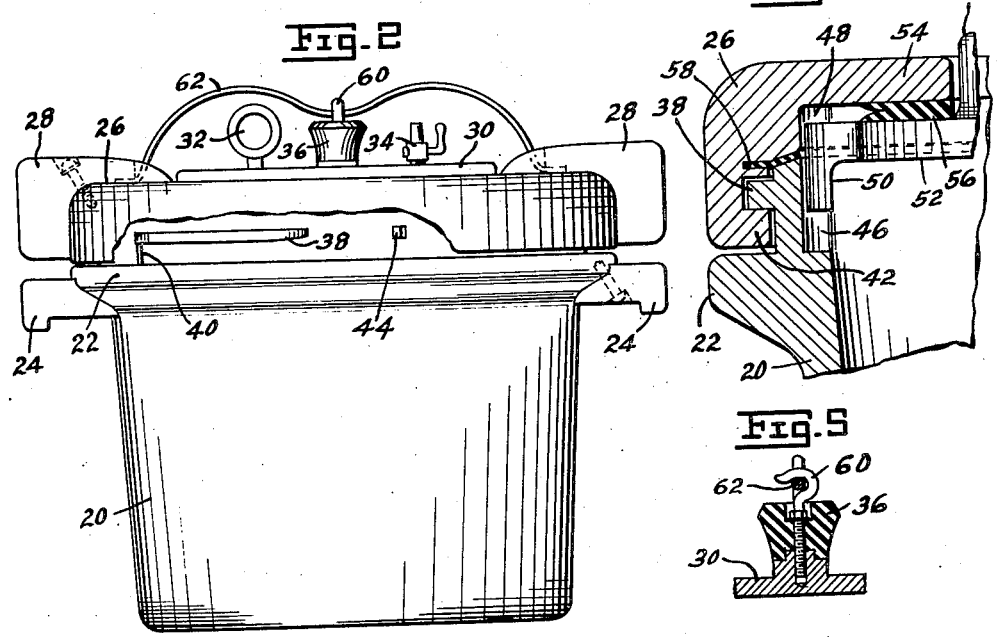
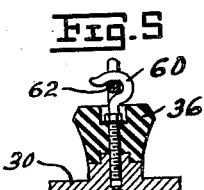
INVENTOR
Bozhidar M. Yankovitch
BY
Pennie, Edmonds, Morton & Barrows
ATTORNEYS Dec. 13, 1949     B. M. YANKOVITCH     2,491,144
PRESSURE COOKER COVER CONSTRUCTION
Filed Oct. 12, 1946     2 Sheets-Sheet 2
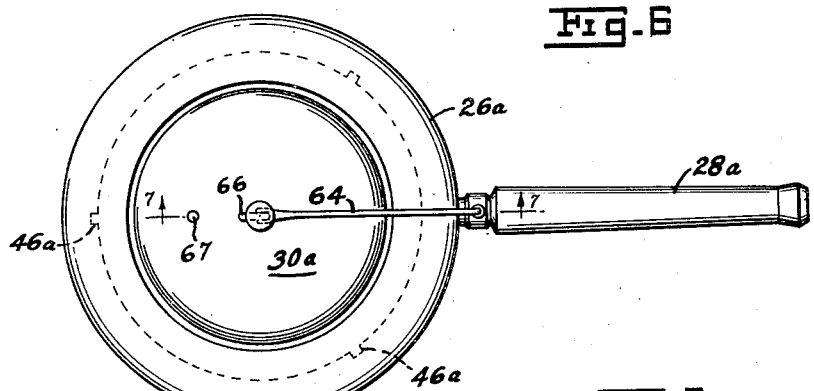
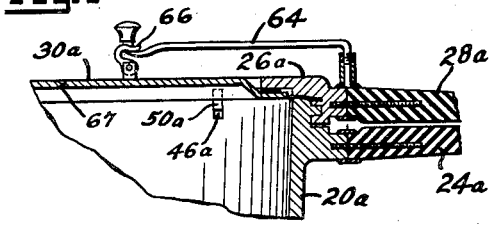
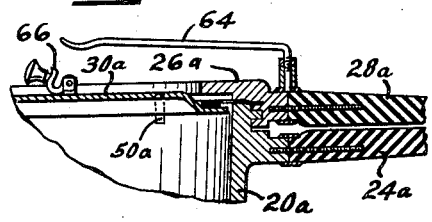
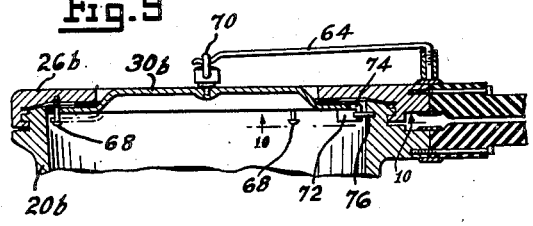
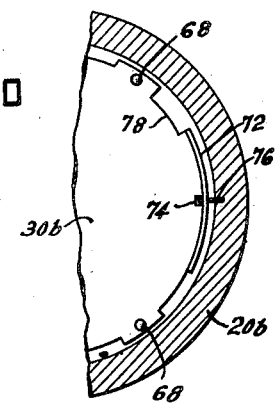
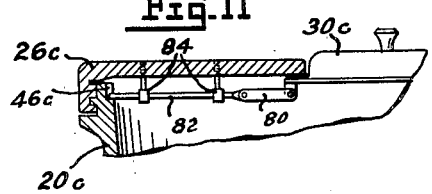
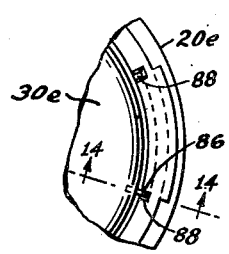
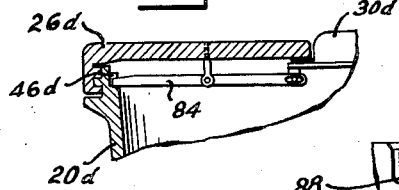
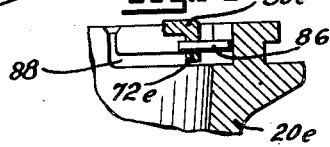
INVENTOR
Bozhidar M. Yankovitch
BY
Pennie, Edmonds, Morton & Barrows
ATTORNEYS Patented Dec. 13, 1949

2,491,144

UNITED STATES PATENT OFFICE 2,491,144

PRESSURE COOKER COVER CONSTRUCTION

Bozhidar M. Yankovitch, New York, N. Y.

Application October 12, 1946, Serial No. 703,041

17 Claims. (Cl. 220—55)

This invention relates to improvements in pressure cooker or pressure vessel structures and more particularly to an improved cover combination adapted to prevent accidents from improper operation of pressure vessels such as pressure cookers.

The pressure vessel of the present invention is an improvement on pressure vessels or cookers of the type in which the cover is secured to the body of the vessel by a bayonet type coupling or joint. In general, pressure cookers of this type are provided with a handle or handles on the body of the cooker and a matching handle or handles on the cover. When vessels of this type are prepared for operation, the cover should be rotated to a position so that the handle or handles of the cover are directly over the corresponding elements of the body of the cooker. This operation of known types of cookers moves regularly spaced lugs or sectional threads on the cover under and in engagement with similar matching elements on the body of the cooker.

This type of pressure cooking vessel is perfectly safe when properly operated, but accidents have occurred because of the failure of the operator to turn the cover to the full locking position. In one instance a pressure cooker of this type was placed in operation and when the pressure in the cooker reached approximately 15 pounds, the cover which had not been moved to full locking position slipped back and was blown off causing considerable damage. Such accidents are understandable when people become so accustomed to using pressure cookers that they set them in operation without thinking of the precaution of moving the cover to the completely locked position.

In pressure cookers of this type, the cover may appear to be locked sufficiently when the lugs are only partly engaged. The production of an internal pressure under such circumstances, however, places an undue strain on the partly engaged lugs, so that if the lugs on the cover do not slip to unlocking position, they may be broken by the pressure and thereby cause a sudden explosion and serious damage.

The primary object of the invention is therefore to provide an improved pressure vessel construction of the general type referred to in which positively acting means are provided which will prevent sealing up of the vessel until the engaging lugs or thread sections are in full locking position.

A further object of the present invention is to provide an improved cover construction for pressure vessels which cannot be completely sealed until the cover locking means is correctly secured to the body of the vessel.

Another object of the present invention is to provide an improved pressure cooker construction which is adapted to vent the cooking vessel unless the cover is properly locked thereto.

In accordance with my invention, I have discovered that the foregoing objects may be achieved by providing a pressure vessel having a cover construction including a cover which loosely fits the body of the vessel and a retaining ring for the cover which is secured to the vessel by a bayonet type of locking joint common in this art and to which the cover is adapted to be sealed. In a preferred construction the loose fitting cover and retaining ring are so arranged and constructed that the cover cannot be brought into sealing relation with the ring until the ring has been turned to its proper locking position on the vessel.

Cooperating means are provided between the cover and the vessel and this means is operative only when the retaining ring is in its fully locked position to permit the raising of the cover to sealing relation with the ring. At the same time the cooperating means is effective to prevent rotation of the ring when the cover is in sealing relation thereto.

In one form of my invention, I provide a loose fitting cover, that is one of smaller diameter than the inside diameter of the vessel, which has a plurality of peripherally extending keys adapted to be received in matching keyways in the upper inside wall of the vessel. The retaining ring is likewise provided with keyways corresponding to those in the vessel, so that when the ring is turned to its fully locked position its keyways directly overlie the keyways in the wall of the vessel thereby permitting the cover to be raised into sealing engagement with the ring. This arrangement of keys and keyways is such that when the ring is only partially turned toward its locking position the keys engage the under side of the ring and prevent the raising of the cover into sealing relationship with the ring.

In another form of my invention, I secure the cover loosely to the retaining ring so that it can be moved vertically up or down with respect thereto but is rotatable therewith. I then provide matching elements, which may be generally referred to as a key and keyway, between the cover and the body of the vessel so that the cover may be raised to its sealing position only when the sealing ring and cover are rotated to full locking position of the ring on the vessel.

Other means may be provided for keeping the cover in unsealed position until the retaining ring is moved into full locking position. The improved apparatus of my invention provides means which will positively prevent operation of the pressure vessel unless the retaining ring is moving to its complete locking position and thereafter prevent turning of the ring until the pressure is down and the cover lowered. Other objects, features, and advantages of my invention will be described in detail hereinafter in connection with the accompanying drawings which form a part of this application.

In the drawings:

Figure 1 is a broken plan view of a pressure vessel or a pressure cooker constructed in accordance with the features of my invention;

Fig. 2 is a broken side elevational view of the pressure cooker shown in Fig. 1;

Fig. 3 is an enlarged fragmentary sectional view taken on the line 3—3 of Fig. 1 and showing the cover in unsealed position;

Fig. 4 is a view similar to that of Fig. 3 showing the cover in sealed position with respect to the retaining ring;

Fig. 5 is an enlarged fragmentary view in vertical section showing one arrangement for supporting the cover;

Fig. 6 is a plan view of a modified form of pressure cooker constructed in accordance with the features of the present invention;

Fig. 7 is a broken vertical sectional view taken on the line 7—7 of Fig. 6, showing the cover in sealed position with respect to the retaining ring;

Fig. 8 is a view similar to Fig. 7, showing the cover in an unsealed position with respect to the retaining ring;

Fig. 9 is a view similar to that of Fig. 7, showing a modified form of pressure vessel embodying the features of my invention;

Fig. 10 is a broken horizontal sectional view looking up from the line 10—10 of Fig. 9;

Fig. 11 is a broken vertical sectional view of a modified form of pressure vessel cover construction made in accordance with the features of my invention;

Fig. 12 is a view similar to that of Fig. 11, showing a modified construction;

Fig. 13 is a fragmentary plan view of a pressure vessel of the type shown in Fig. 9, illustrating a modified form of locking means between the cover and the body of the pressure vessel;

Fig. 14 is a fragmentary vertical sectional view taken on the line 14—14 of Fig. 13.

The pressure vessel or pressure cooker shown in Figs. 1–5 illustrate a pressure cooker construction generally employed for cookers of relatively large capacity as, for example, from 6 or 8 quarts up. The pressure cooker here shown includes a pot or body portion 20 having a projecting flange 22 to which are attached handles 24 of insulating material. The cover unit includes a retaining ring 26 provided with handles 28 of insulating material and a cover 30 which seals against the underside of the retaining ring and which is provided with a pressure gauge 32, a pressure relief valve 34 and a knob 36.

The body of the cooker 20 extends above the reinforcing flange 22, as shown in Figs. 2, 3 and 4, and carries a plurality of regularly spaced outwardly extending lugs, thread or flange sections 38. These flange sections preferably extend substantially parallel to the reinforcing flange 22 and one of them terminates at a stop pin 40, as shown in Figs. 1 and 2. The retaining ring fits down over the top of the pot 20 and includes inwardly extending flange sections or lugs 42 which pass between the flange sections 38 when the ring 26 is placed on the pot, and pass under these flange sections when the retaining ring is rotated clockwise (Fig. 1) into complete locking position, so that one of the flange sections 42 engages the pin 40. In this position the handles 28 are arranged to be directly over the handles 24. Furthermore, the arrangement is such that a particular handle 28 is always over the same handle 24 because of the provision of a small orienting lug 44 (Fig. 2), over which a corresponding notch in a flange section 42 passes when the retaining ring is lowered onto the pot.

The inside wall of the vessel 20 is provided with a plurality of keyways 46 which extend through the top of the wall downwardly to a given level. The retaining ring 26 is provided with matching keyways 48 which are directly over the keyways 46 when the ring is in full locking position. Three keyways are shown in Fig. 1, but a greater number may be employed if desired.

The cover 30 is of somewhat smaller diameter than the inside of the vessel 20 at the top, and is provided with peripheral keys 50 which are arranged to be inserted in the keyways 46 and 48. The cover may be of any desired form but preferably including a substantially flat peripheral section 52 which extends under a substantially flat annular section 54 of ring 26. An annular rubber or composition sealing ring or gasket 56 is provided on the annular section 52 of the cover, and an annular gasket or seal 58 is mounted between the ring 26 and the top or seat of the vessel 20 and retained in an annular slot in the sealing ring 26, as shown.

The keys 50 are preferably of the L-shaped structure as shown, so that each includes a substantially vertical key section, these sections being movable vertically in the combined keyways 46 and 48. The arrangement is such that when the cover 30 is down, as in Figure 3, the keys 50 rest upon the bottom of the keyways 46 and do not extend into the keyways 48 in the ring, thus permitting the ring to be rotated either for locking or unlocking. However, when the cover 30 is lifted so that the keys 50 enter the keyways 48, the keys are sufficiently long to engage both keyways 46 and 48 and thereby prevent rotation of the retaining ring 26.

In the operation of the pressure cooker shown in Figs. 1—5, the cover is first placed in position with the keys 50 registering in the respective keyways 46. The retaining ring is then placed on the cooking vessel and rotated to full locking position where the keyways 48 are directly over the corresponding keyways 46. The cover 30 may remain in the position shown in Fig. 3 until steam begins to pass around the cover and ring, as indicated by the arrows in Fig. 3, at which time the operator may lift the cover by the handle 36 and hold it until the steam pressure supports the cover against the sealing ring. However, as shown in Figs. 1, 2, and 5, the cover may be held in its upper position by means of a hook 60 which is adapted to engage a bail-like supporting member 62, the ends of which are held in slots in the handles 28 as indicated.

If in the operation of the pressure cooker the retaining ring 26 is not rotated to the full locking position, the keyways 48 will not be directly over the keyways 46 and therefore it will be impossible to raise the cover 30 to sealing position because the keys will engage the under side of the ring. Steam will therefore continue to pass around the cover 30 and the annular section 54 on the ring 26. This will show the operator that the retaining ring has not been turned up properly. It is therefore impossible to operate the pressure cooker under pressure without having the ring 26 in the full locking position. Furthermore, after the pressure has been built up in the cooker with the cover 30 in the position indicated in Fig. 4, it will be impossible to move the retaining ring 26 until the pressure is down to atmospheric and the cover 30 lowered to the position shown in Fig. 3, because the keys 50 positively prevent rotation of the ring 26 with respect to the vessel when they are in the position shown in Fig. 4. The operator therefore may not open the pressure cooker or even turn the ring 26 until the cover 30 has been let down. After the pressure in the cooker is up the hook 60 may be taken off. When the pressure falls to atmospheric or below, the cover will fall or be drawn down with an audible click when the keys hit the bottoms of the keyways 46.

In the operation of pressure cookers or other pressure vessels of relatively large capacity, it is generally desirable to have the pressure gauge oriented in the same direction every time the cover structure is applied. In the present instance this is accomplished by the unequal spacing of the keys 50 and keyways 46 and 48. For example, as indicated in Fig. 1, the two keys to the left, in dotted lines, are closer together than either of them are to the key at the upper right. In other words, they are slightly more than 120° from the key 50 at the upper right. The cover 30 therefore can be inserted in the vessel 20 only in one position so that the pressure gauge 32 is always facing in a given direction between the handles 24. The retaining ring 26 is likewise oriented by means of the lug 44 so that the supporting member 62 is always in proper relation with respect to the hook 60 when the ring 26 is turned to its full locking position.

The modified form of pressure cooker shown in Figs. 6, 7, and 8 includes essentially the cover construction described above, but in a form suitable for cookers of smaller capacity, as for example, from 3 to 6 quarts. The pressure cooker shown in these figures includes a pot or vessel 20a provided with a relatively long handle 24a of insulating material while the retaining ring 26a is provided with a similar handle 28a. The cover 30a includes the same key arrangement as that shown in Figs. 1 to 4, the keys, however, being uniformly spaced as indicated in Fig. 6 in which keyways 46a are shown in dotted lines.

In Fig. 7 the cover 30a is shown as supported in its upper position by a spring rod 64 mounted on the handle 28a and engaged by a knobbed hook 66 pivoted to the cover. The rod 64 has an upturned point which engages in a recess in the hook 66 to hold the cover 30a in its upper position. When the pressure is up or a cooking operation has been completed, the hook 66 is disengaged as in Fig. 8 to permit the cover to drop down so that the retaining ring may be unscrewed as in the case of the pressure cooker shown in Figs. 1 to 4. If desired, the keys and keyways of the cooker shown in Figs. 6 to 8 may be unequally spaced and the retaining ring oriented as in Figs. 1 to 4 to positively position the hook 66 with respect to the member 64. This cover supporting member 64 may be of any suitable construction but is shown as threaded into a sleeve so that it may be swung around directly over the handle 28a, or removed. In Figs. 6 and 7 an opening 67 is provided for a safety plug or other device.

The pressure cooker shown in Figs. 9 and 10 is generally similar to that shown in Figs. 6 to 8 and is provided with the same type of retaining ring locking means as that shown in Figs. 1 to 4. In Fig. 9, however, the cover 30b is attached to and rotatable with the retaining ring 26b by means of screw bolts 68, at least three of which are employed to support the cover 30b in vertical movable relationship with respect to the retaining ring so that the cover in its down position rests on the heads of the screw bolts 68, while in its upper position it is sealed with respect to the retaining ring 26b the same as in the other forms of the apparatus described above. The bolts 68 extend through holes in the cover and orient the cover with respect to the retaining ring. The cover is held in its upper position by means of a supporting member 64 similar to that shown in Fig. 7, except that this member is engaged by a bail-like handle 70.

The cover 30b is provided with a downwardly projecting flange section 72, and at this section the edge of the cover is slotted as at 74 to provide a slot or keyway which extends in from the periphery and down into, but not through, the flange section 72. When the retaining ring 26b is rotated to its full locking position with the cover 30b down, the slot 74 is directly under a pin or key 76 fixed in the upper portion of the wall of the vessel 20b. In this position only is it possible to raise the cover into seating relation with the ring. The retaining ring 26b is therefore secured against rotation until the cover 30b is lowered so that the slot 74 is below the pin 76.

In the operation of the apparatus shown in Figs. 9 and 10, it will be apparent that when the assembled retaining ring and cover are placed upon the body of the vessel, the cover 30b must fall below the pin 76. The cover 30b is therefore notched with a wide notch 78, as shown in Fig. 10, so that in the unlocked position of the retaining ring the cover 30b can drop to rest on the heads of the screw bolts 68 to take a position below the level of the pin 76. Now as the retaining ring 26b and attached cover are rotated toward the locking position, the edge of the cover 30b moves along under the pin 76 until the slot 74 is directly below, which is the full locking position for the retaining ring 26b. The cover 30b may therefore be raised with the slot 74 engaging the pin 76. The operator is therefore sure that since the cover may be raised to the sealing position, the ring is properly locked and cannot be unlocked because of the screw bolts 68 until the pressure is released and the cover lowered at the completion of the pressure cooking operation.

Fig. 11 illustrates a further modification of the pressure cooker construction in which the main body of the cooker 20c is locked to a retaining ring 26c in the manner described in connection with Figs. 1 to 4 by means of a bayonet joint or coupling. The cover 26c in this instance includes a relatively wide inwardly extending annular section which is engaged from below by a flat section of a vertically movable cover 30c. The upper inside wall of the vessel 20c is provided with keyways 46c, which may be three or more in number, but there are no keyways in the retaining ring. When the cover 30c is lifted to the position shown in Fig. 11, it operates a link 80 and a rod 75 or key 82 for each keyway to push the end of the rod into the keyway. The keyways and rods 82 are arranged so that they cooperate only when the retaining ring 26c is in the full locking position, otherwise, the rod 82 will merely engage the side wall of the vessel 20c and prevent the raising of the cover 30c. The rods 82 are slidably mounted in retaining members 84 attached to the ring 26c so that the cover is supported by and rotates with the ring, thereby providing positive means for indicating that the retaining ring is in fully locked position. Furthermore, it will not be possible to move the ring until the cover 30c is lowered.

Fig. 12 of the drawings shows a construction very similar to that of Fig. 11 in which the retaining ring 26d is locked to the vessel 20d by a bayonet joint as described above and in which keyways 46d are provided at spaced intervals around the inside of the vessel to receive the ends of pivoted links or keys 84. The cover 30d is attached to the inner ends of the links 84 by a slot and pin connection, as shown, so that the cover may be moved vertically to rock the link in and out of the keyways 46d. In the operation of the cooker shown in Fig. 12, the cover 30d is down when the retaining ring is set on the vessel 20d, with the outer end of the link 84 riding above the keyways on the upper portion of the vessel. When the retaining ring is moved into full locking position, the outer ends of the links 84 are directly above their respective keyways so that the cover 30d may be lifted into sealing position with the ring.

The modified form of construction shown in Figs. 13 and 14 is adapted for use in connection with a pressure cooker of the type shown in Figs. 9 and 10 in which the cover is held in a nonrotatable position with respect to the retaining ring as, for example, by means of the screw bolts 68. In Figs. 13 and 14 a cover 30e is provided with a downwardly projecting peripheral flange section 72e at one side in which is mounted an outwardly projecting pin or key 86. While the cover 30e is of smaller diameter than the inside of the vessel 20e, the pin 86 is sufficiently long to engage a U-shaped recess or slot or keyway 88 in the upper inner face of the vessel. When the retaining ring (not shown) and cover are placed on the body of the vessel in the unlocked position, the pin 86 enters the recess 88 at the top of the vessel, that is to the left as shown in Fig. 14, so that the cover 30e may drop down in unsealed position where it is carried by the screw bolts as in the cooker of Fig. 9. Now when the retaining ring (and cover) are rotated to locking position, the pin 86 moves along the horizontal section of the recess 88 until it reaches the righthand vertical section of the recess as shown in Fig. 14, which is the fully locked position for the retaining ring. At this point the cover 30e may be raised to its sealing position with the retaining ring as in Fig. 9. The pin 86 in this position, in the vertical section of recess 88, prevents rotating of the retaining ring until the cover is lowered. If an attempt were made to raise the cover 30e while the pin 86 is in the horizontal section of the recess 88, it will be apparent that this could not be done and therefore the cover could not be sealed until the retaining ring and cover are rotated to the fully locked position.

In the various forms of the pressure cooker or pressure vessel shown in Figs. 6 to 14, it will be understood that the cover will be provided with the conventional blowout safety plug, usually of some rubber composition, and the conventional pressure gauge or weighted pressure control all of which are common in the art. The seals 56 and 58, or equivalent sealing means, are used in all forms of the apparatus, and the seal 56 may be secured to the cover or to the ring.

The pressure vessel of the present invention is automatically safe to operate because it is impossible for the cover in any form of the invention to be lifted into sealing engagement with the retaining ring unless the ring has been brought to full locking position on the vessel. Furthermore, once the cover of the vessel has been brought into its upper position and held there by pressure in the vessel, it is impossible to rotate the ring to an unlocked or partially locked position. Before the ring can be moved, the cover must be lowered to operate the means which cooperates with the ring and vessel to unkey it or otherwise unlock the ring with respect to the vessel.

From the foregoing description it will be understood that various modifications may be made in the means for preventing sealing of the vessel until the ring is fully locked and for keying or locking the ring with respect to the vessel to prevent relative rotation. The ring may be made so that the cover in its up or down position is above the body of the cooker and provided with one or more keys or keyway members extending down to engage cooperating elements in or on the vessel body. While the coupling between the ring and vessel has been described in connection with the presently known bayonet type, or flange section type of joint, it is to be understood that sectional threads or other suitable means may be employed for coupling the ring to the vessel by relative rotation of the two elements. These and other modifications are contemplated as coming within the spirit and scope of the invention as defined by the appended claims.

What I claim as new is:

1. In a pressure vessel having an opening bounded by an annular closure seat, a cover fitting loosely inside said opening, an annular cover-retaining ring rotatable with respect to the vessel into a locking position around the vessel opening and adapted to be sealed with respect to the annular closure seat, the ring including an annular section projecting over a substantial annular portion of the opening and over the peripheral outer surface of the cover, means for forming a fluid-tight seal between the upper peripheral portion of the cover and the underside of the projecting annular section of the ring, the cover being movable into and out of sealing relation with respect to the under side of said annular section of the ring, and means cooperating with the cover, ring and vessel for preventing movement of the cover into sealing engagement with the ring unless the ring is in fully locked position on the vessel.

2. In a pressure vessel having an opening bounded by an annular closure seat, a cover supported by the vessel in said opening and of smaller diameter than that of the opening, an annular cover-retaining ring rotatable with respect to the vessel into a locking position around the vessel opening and adapted to be sealed with respect to the seat, the ring including an annular section projecting over the peripheral outer surface of the cover, means for effecting a fluid-tight seal between the ring and cover, the cover being movable into and out of sealing relation with respect to the under side of said annular section of the ring and being nonrotatable with respect to the vessel, and means on the cover cooperating with the ring and vessel for preventing movement of the cover into sealing engagement with the ring unless the ring is in fully locked position on the vessel.

3. In a pressure vessel including a vessel body having an opening and a closure mechanism therefor comprising a cover and an annular cover-retaining ring rotatable with respect to the vessel body into a locking position around the vessel opening and adapted to be sealed with respect thereto, the ring including an annular section projecting over a peripheral outer surface of the cover, a sealing element for effecting a fluid-tight seal between the cover and the underside of the projecting annular section of the ring, the cover being movable into and out of sealing relation with respect to the under side of said annular section of the ring, and means cooperating with the cover, ring and vessel for preventing movement of the cover into sealing engagement with the ring unless the ring is in fully locked position on the vessel, said means being effective when the cover is in sealing engagement with the ring for preventing rotation of the ring with respect to the body of the vessel.

4. A pressure vessel as defined by claim 3 in which the cover is rotatably fixed with respect to the vessel body and said means comprises a key carried by the cover, and matching keyways in the ring and vessel body.

5. A pressure vessel as defined by claim 3 in which the cover is rotatably fixed with respect to the ring and said means comprises a key carried by one of the elements consisting of the vessel body and the cover, and a keyway in the other of said elements.

6. A pressure vessel as defined by claim 3 in which the cover is rotatably fixed with respect to one of the elements consisting of the vessel body and the ring, and in which said means includes a unit comprising a key engaging a keyway when the cover is in sealing engagement with the ring.

7. A pressure vessel as defined by claim 3 in which said means includes a unit comprising a key engaging a keyway when the cover is in sealing engagement with the ring.

8. A pressure vessel as defined by claim 3 in which means carried by the vessel is provided for supporting the cover in a position in sealing engagement with the ring.

9. In a pressure cooker including an open topped cooking vessel having an annular closure seat, a cover of smaller diameter than the vessel opening mounted in the upper portion of the vessel, an annular cover-retaining ring rotatable into locking position on the vessel and adapted to be sealed fluid-tight with respect to the seat, the ring including an annular section projecting over the peripheral upper surface of the cover, means between the peripheral portion of the cover and the under-side of the annular section of the ring for effecting a fluid-tight seal, the cover being movable vertically into and out of sealing relation with respect to the under side of said annular section of the ring, and means carried by the cover for locking the ring against rotation in its fully locked position on the vessel when the cover is raised into sealing engagement with the ring.

10. In a pressure cooker including an open topped cooking vessel having an annular closure seat, peripherally spaced keyways in the upper inner wall of the vessel, a cover of smaller diameter than the vessel opening mounted in the upper portion of the vessel on keys fitting in said keyways, an annular cover-retaining ring rotatable into locking position on the vessel and adapted to be sealed with respect to the closure seat thereof, the ring including an annular section projecting over the peripheral upper surface of the cover, corresponding keyways in the under portion of the ring matching with the keyways in the vessel when the ring is in its fully locked position, the cover and the keys thereof being vertically movable in the upper portion of the vessel into and out of sealing relation with the under side of said annular section of the ring, the keys at the same time being movable into and out of a position to key the ring to the vessel, whereby the ring is rotatable with respect to the vessel when the cover is down and is locked to prevent rotation when the cover is up.

11. In a pressure cooker including an open topped cooking vessel having an annular closure seat, peripherally spaced keyways in the upper portion of the inner wall of the vessel, a cover for the vessel having keys fitting in said keyways, an annular cover-retaining ring rotatable into locking position on the vessel and adapted to be sealed with respect to the closure seat thereof, the ring including an annular section projecting over the peripheral upper surface of the cover, means for sealing the cover to the ring, and keyways in the under portion of the ring matching with the keyways in the vessel and being respectively directly thereover when the ring is in its fully locked position, the cover and the keys thereof being movable vertically to seal and unseal the cover to the under side of said annular section of the ring only when the ring is in fully locked position, the keys at the same time being movable vertically into and out of a position to key the ring to the vessel, whereby the ring is rotatable with respect to the vessel when the cover is down and is locked to prevent rotation when the cover is up.

12. A pressure cooker as defined by claim 11 in which at least three keys and corresponding keyways are provided, at least one of the keys being unequally spaced with respect to the peripherally adjacent keys, whereby the cover is oriented in a specific position with respect to the vessel.

13. A pressure cooker as defined by claim 11 in which at least three keys and corresponding keyways are provided, the keys being fixed to the cover and adapted to support the cover on the vessel.

14. In a pressure cooker including an open topped cooking vessel having an annular closure seat, at least three peripherally spaced keyways in the inner rim of the vessel, a cover for the vessel having projecting keys fitting in said keyways and adapted to support the cover on the vessel, an annular cover-retaining ring rotatable into locking position on the vessel and adapted to be sealed with respect to the closure seat thereof, the ring including an annular section projecting over the peripheral upper surface of the cover in spaced relation thereto, and keyways in the under portion of the ring directly over the keyways in the vessel when the ring is in its fully locked position, the cover being movable vertically from its rest position into sealing relation with the under side of said annular section of the ring only when the ring is turned to its fully locked position, the keys being of such a length that they engage the under portion of the ring and prevent raising of the cover to sealing position when the ring is not turned to the full locking position on the vessel.

15. A pressure cooker as defined by claim 14 in which readily detachable means is provided for holding the cover in its upper position in sealing relation with the under side of the ring.

16. In a pressure vessel including a vessel body having an opening and a closure mechanism therefor, comprising an annular ring rotatable with respect to the vessel body into a locking position around the vessel opening and adapted to be sealed with respect thereto, the ring including an annular section projecting over the peripheral portion of the opening, a cover for the opening in the ring and having a peripheral portion extending under the projecting annular section of the ring, means for forming a fluid-tight seal between the upper portion of the cover and the under portion of the ring, the cover being movable into and out of sealing relation with respect to the under-side of said annular section of the ring, and means cooperating with the cover, ring and vessel for preventing movement of the cover into sealing engagement with the ring unless the ring is in fully locked position on the vessel, said means being effective when the cover is in sealing engagement with the ring for preventing rotation of the ring with respect to the body of the vessel.

17. In a pressure vessel including an open-topped vessel body and a closure mechanism for the open top of the vessel body, comprising a closure member rotatable with respect to the vessel body into a locking position around the vessel opening and adapted to be sealed with respect thereto, said closure member having an opening therethrough, a cover member mounted below the closure member for closing the opening therein, a member for effecting a fluid tight seal between the cover member and the under side of the closure member bordering the opening therein, an elongated member pivoted to the under side of the closure member and carrying the cover member on one end thereof, the cover member being movable into and out of sealing relation with respect to the under side of the portion of the closure member bordering the opening therein, and structure means associated with the end of the pivoted member remote from the cover member and the vessel body for preventing pivoting of the pivot member to move the cover member into sealing engagement with the opening in the closure member, unless the closure member is in fully locked position on the vessel, said structure means being effective when the cover member is in sealing engagement with the opening in the closure member for preventing rotation of the closure member with respect to the vessel body.

BOZHIDAR M. YANKOVITCH.

REFERENCES CITED

The following references are of record in the file of this patent:

UNITED STATES PATENTS

| Number | Name | Date |
|---|---|---|
| 2,022,868 | Nelson | Dec. 3, 1935 |